Patented Feb. 9, 1937

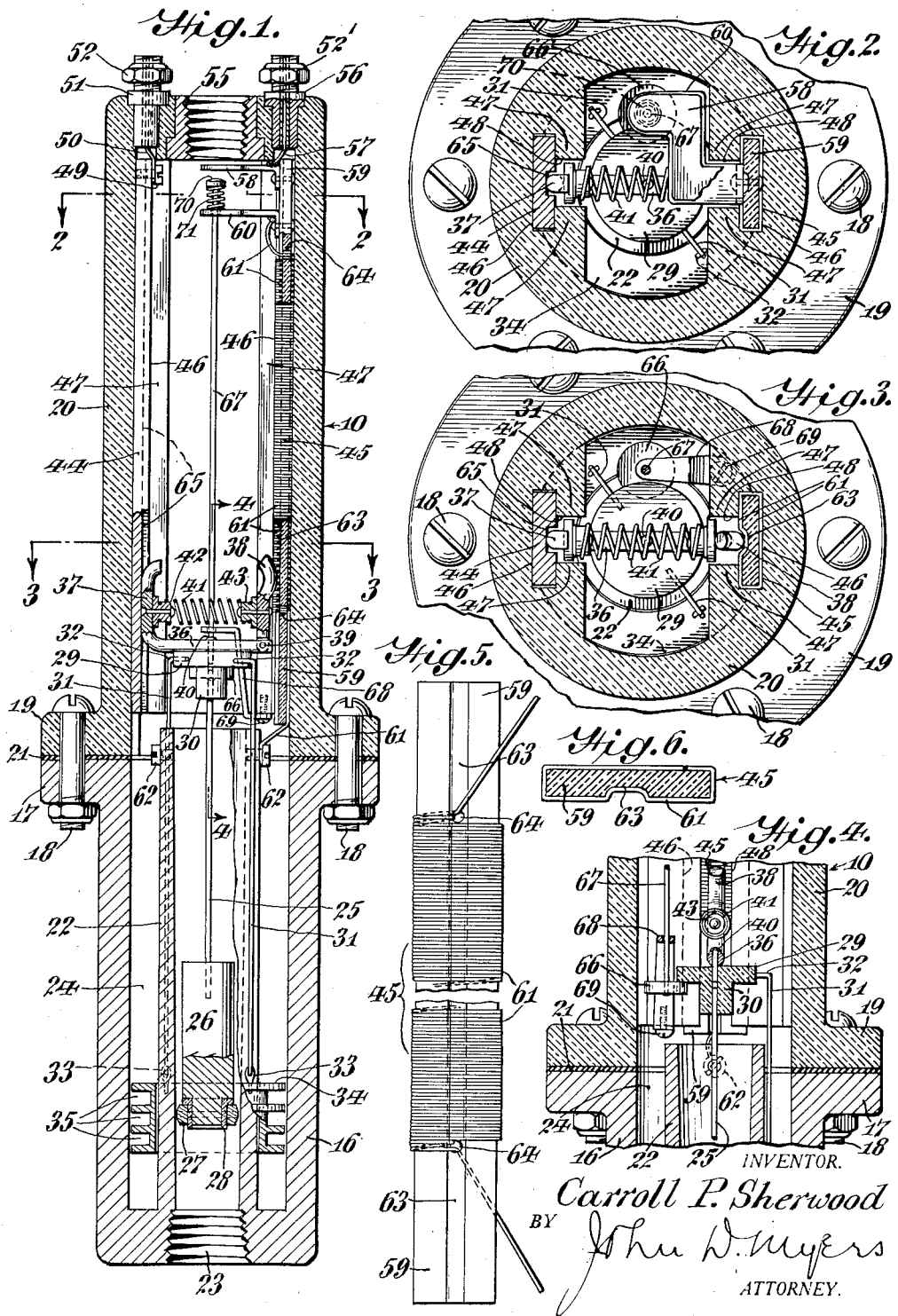

2,070,376

UNITED STATES PATENT OFFICE 2,070,376

CIRCUIT CONTROL DEVICE

Carroll P. Sherwood, Camden, N. J., assignor to American Gasaccumulator Company, a corporation of New Jersey Application August 8, 1934, Serial No. 738,969

10 Claims. (Cl. 201—48)

The invention relates to circuit control devices and involves an improvement in variable resistance structures adapted for use in flow meter apparatus and the like. Although the device illustrated herein is particularly adapted for use in connection with apparatus for indicating the rate of flow of gasoline when supplied to internal combustion engines of automobiles, motor-boats, airplanes and the like, it will be apparent that the improvements are readily adaptable for other purposes where it is desired to throw more or less of a fixed resistance in circuit.

One of the requisites of flow meter apparatus of this general character is that it be so designed and so constructed as to indicate accurately the rate of flow of a fuel such as gasoline under all conditions of use of the vehicle or the like in which the apparatus is incorporated. In the case of an electrically actuated indicating device utilizing a variable resistance control, it is also a requisite of such a structure that the movable contactor for varying the resistance in the indicator circuit be sensitive to the movements of the metering device proper.

In order to meet these requirements in such apparatus and provide the necessary sensitivity, the relatively movable parts of the variable resistance device should be so constructed as to have as little frictional resistance as possible during their operation. Both the movable contactor and its cooperating stationary resistance element should be so constructed that the contactor may move freely over the resistance element and be immediately responsive to the movements of the metering device, that is, to changes in the rate of flow of the gasoline or other liquid. It is also desirable that the contactor be properly guided in its movements over the resistance element, and that this be accomplished with a minimum of frictional resistance to the free movement of the contactor.

Such objections to the apparatus of this kind heretofore known have been eliminated to a large extent in my invention by connecting the movable contactor directly to the metering device and by completely enclosing all the elements of the variable resistance unit within a casing which serves as a flow chamber for the gasoline, thereby avoiding the use of friction bearings, stuffing boxes and the like, and furnishing a lubricant at all times for the moving parts of the unit.

The purposes of the device also demand, if an accurate indication of the rate of flow is to be secured, that the contactor be of a delicate construction in order that proper engagement may be maintained with the resistance element at all times during the normal operation of the apparatus. Some means is also desirable for preventing a contactor of this type from being dislodged from its engagement with the resistance element when the apparatus is subjected to abnormal physical disturbances, such as unusual road conditions, sudden increase and decrease in speed of the vehicle, and abrupt changes in direction thereof.

It is also desirable for various reasons that the electrical circuit of such apparatus be interrupted, either upon discontinuance of the flow of gasoline, or upon a predetermined minimum flow, and this requirement, if properly met, necessitates the employment in the circuit of a switch which is sufficiently sensitive to be operated by the movements of the metering device or the movable contactor. It is preferable, in order to insure the necessary sensitivity of the apparatus, that the movable contactor be kept in engagement with the resistance element at all times, and that means be provided for interrupting the circuit between the source of electric energy and the resistance element.

One of the principal objects of the invention is the provision in flow meter apparatus of a variable resistance device so constructed that the rate of flow of the fluid may be accurately indicated at all times.

Another object of the invention is the provision in flow meter apparatus of a variable resistance structure wherein the movable contactor is operated directly by the metering device.

Another object of the invention is the provision of a variable resistance device which is so constructed that the movable contactor may be operated with a minimum of friction.

A further object of the invention is the provision of a variable resistance device in which all the elements thereof are enclosed within a casing, such as a flow chamber, and are at all times submerged in gasoline or other liquid the flow of which the apparatus is designed to indicate.

A still further object of the invention is the provision of improved means for guiding the contactor in its movements over the resistance element, and means for preventing the contactor from being dislodged from its engagement with the resistance element by reason of abnormal physical disturbances.

It is also an object of the invention to provide an improved resistance element, an improved contactor for cooperation therewith, and improved means for supporting the resistance element and the stationary contact strip cooperating therewith.

A still further object of the invention is the provision of improved means for interrupting the circuit in which the variable resistance device is connected.

Still other objects and advantages of the invention will be apparent from the following description, taken with the accompanying drawing wherein:

Fig. 1 is a vertical sectional view through the flow chamber of my apparatus showing my improved control device incorporated therein;

Fig. 2 is a transverse sectional view through the flow chamber, slightly enlarged, taken on the line 2—2 of Fig. 1;

Fig. 3 is a transverse sectional view through the flow chamber, slightly enlarged, taken on the line 3—3 of Fig. 1;

Fig. 4 is a vertical sectional view taken at right angles to Fig. 1 and on the line 4—4 of Fig. 1;

Fig. 5 is a longitudinal view, enlarged and partly broken away, of my improved resistance element; and Fig. 6 is a transverse sectional view through the resistance element shown in Fig. 5.

While it is equally useful for other purposes, as illustrated in the drawing my improved control device is designed to be incorporated within a flow chamber 10 connected in the gasoline line of an automobile or the like between the source of supply and the engine. The flow chamber 10 is formed by a lower cylindrical casing section 16 having an outwardly extending flange 17 on the upper end thereof which is secured by bolts 18 or otherwise to an outwardly extending flange 19 on the lower end of an upper cylindrical casing section 20, with a gasket 21 of suitable material interposed between the two flanges.

Although it may be made of other suitable material, as I have disclosed the same herein the lower casing section 16 is made of cast iron with a metering tube in the form of a tubular inlet member 22 projecting upwardly therein around the inlet opening 23 and spaced uniformly from the outer wall to provide a dashpot cistern 24 in open communication at its upper end with the interior of the flow chamber. For reasons which will hereinafter appear, the upper end of the tubular member 22 terminates slightly above the juncture of the upper and lower casing sections, and the diameter of the opening through the tubular member 22 increases gradually from a point near the lower end thereof to its upper end.

Suspended within the tubular member 22 upon the lower end of a connecting rod 25 is a weight member 26 having a metering disc 27 fixed upon the reduced lower end thereof. The metering disc 27 is preferably constructed of metal and is insulated from the weight member 26 as shown at 28 when the weight member is of metallic construction. A disc 29 of suitable insulating material is provided with a projecting hub 30 within which the upper end of the connecting rod 25 is rigidly secured. Each of a pair of oppositely arranged supporting rods 31 has its upper end bent laterally as shown at 32 and is rigidly secured within a suitable opening in the disc 29. The supporting rods 31 extend downwardly in the dashpot cistern 24 and, as shown herein, the lower ends thereof engage within eyes 33 secured diametrically in the upper end of an annular piston 34 freely movable within the cistern 24. The outer face of the piston 34 is provided with a plurality of circumferential grooves 35 which serve to permit any small particles of dirt in the gasoline to work downwardly past the piston so as not to interfere with its proper operation.

Rigidly secured to the upper face of the disc 29 for longitudinal movement within the upper section 20 of the flow chamber is a movable contactor comprising a transversely extending support 36 having a rigid contact shoe 37 extending laterally from one end thereof and a relatively movable contact shoe 38 pivoted at 39 to its opposite end. The pivoted contact shoe is preferably bowed at its free end to form a contact element for engagement with the resistance hereinafter referred to. The support 36 is rigidly secured to the disc 29 by means of a headed pin 40 passing through a central opening in the support and securely engaging within an opening in the upper face of the disc 29. A small coiled expansion spring 41 having one end secured to a boss 42 riveted or otherwise secured to the rigid contact shoe 37 and its opposite end secured to a boss 43 riveted or otherwise secured to the pivoted contact shoe 38 serves to spread the contact shoes and keep them in engagement with a stationary contact strip 44 and a stationary resistance strip 45 supported longitudinally within the upper section 20 of the flow chamber.

The upper section 20 of the flow chamber casing is preferably molded from suitable insulating material, and is so constructed as to provide oppositely arranged channels 46 extending lengthwise of the wall thereof and having overhanging edge portions 47 forming oppositely arranged slots 48 through which the channels open to the interior of the casing section, and which serve as guideways for the movable contactor.

The contact strip 44 may be made of brass and is of such cross-section as to provide a comparatively tight frictional fit within its channel 46. The resistance strip 45 is likewise so formed as to fit snugly within its channel 46. By forming the channels 46 in the casing section 20 when the section is molded, they may readily be made parallel throughout their length, and the parallelism of the contact strip 44 and the resistance strip 45 will be maintained notwithstanding such changes in temperature as would tend to warp or bow these strips if they were rigidly secured at spaced points to the wall of the casing.

The upper end of the contact strip 44 has secured thereto by a screw 49 or other suitable means a short conductor wire 50 having its outer end soldered or otherwise secured in conducting relation within a terminal bushing 51 molded in the upper end of the casing section 20 and provided with a lock nut 52 by means of which a wiring connection may be made with an indicator in a well known manner. It is preferable that the indicator be of the voltmeter type, graduated in gallons per hour or other suitable units.

A fluid outlet bushing 55 to which the fuel line is connected is molded in the upper end of the section 20. A bushing 56 provided with a lock nut 52' is also molded in the upper end of the casing section 20 to serve as a terminal by means of which the resistance strip 45 may be connected to a battery or other source of electric energy. A short conductor wire 57 soldered in the bushing 56 has its lower end soldered or otherwise connected to a stationary contact member 58 preferably riveted to the upper end of the core 59 of the resistance strip 45. Another stationary contact member 60 spaced from the contact member 58 is likewise riveted to the core 59 and has the upper end of the resistance wire 61 soldered thereto. The lower end of the resistance wire 61 is preferably grounded by connecting it to the metallic lower casing section 16. As shown herein it is connected to the tubular member 22 by means of one of a pair of oppositely arranged screws 62 which serve as stops to limit the movement of the piston 34 and the contactor in an upward direction. The extension of tubular member 22 beyond the open end of section 16 facilitates the connection of the wire 61 to the screw 62 in assembling the device.

The core 59 of the resistance strip 45 is preferably made of suitable insulating material, and is provided with a groove 63 extending lengthwise of one face thereof as clearly shown in Fig. 5. The resistance wire 61 is spirally wound upon the core and the opposite ends are looped through openings 64 extending transversely through the core and connecting with the groove 63. The coils of the winding are then depressed into the groove 63 by means of a suitable tool. When assembled in casing section 20, the upper end of the wire is connected to the lower stationary contact 60 while the lower end is grounded in the manner hereinbefore described. By making the resistance strip in this manner the coils are drawn tightly about the core thus preventing any endwise movement thereof, and forming a smooth, depressed guideway for engagement by the pivoted contact shoe 38. This groove, in cooperation with the lengthwise groove 65 in the contact strip 44, serves to guide the movable contactor in its movement over the resistance strip 45 within the flow chamber.

The relative diameters of the interiorly tapered tubular member 22 and the metering disc 27 are such that when the metering disc is in its lowermost position, as shown by the drawing, the orifice or passageway between the metering disc and the wall of the tube will permit a slight flow of gasoline therethrough. It is advisable to provide for such a flow in order to prevent any interference with the free movement of the metering disc such as is likely to result by entirely closing the orifice.

The metering disc is supported in its lowermost position by the engagement of the disc 29 on the upper end of the connecting rod 25 with a disc 66 on the lower end of a switch actuating rod 67 the lower end of which is guided in an opening in a small bracket 68 secured to the wall of the upper casing section by means of a screw 69, and the upper end of which is guided in an opening in the stationary contact member 60. The upper end of the switch operating rod 67 is provided with a contact head 70 movable to and from the stationary contact 58 to make and break the circuit from the source of electric energy to the upper end of resistance 45. A small coiled spring 71 between the contact head 70 and the stationary contact 60 operates to move the head 70 into contact with the stationary contact 58 as soon as there is sufficient flow of gasoline through the device to raise the metering disc 27 and thereby lift the disc 29 out of engagement with the disc 66 on the lower end of the switch operating rod 67.

In the operation of the apparatus disclosed herein, gasoline is delivered from the usual supply tank through the fuel line by means of a vacuum feed device or a positively acting pump to the lower end of flow chamber 10 through the metering tube 22. The pressure of the gasoline upon the metering disc 27 will raise this disc together with the weight member 26 to such an extent as to provide an orifice of a size corresponding to the rate of flow of the gasoline, and it will be apparent that variations in the flow of gasoline through the metering tube 22 will position the metering disc 27 to accord with the rate of flow.

The movements of the metering disc 27 are transmitted through the rod 25 to the movable contactor carried by the disc 29, and the pivoted contact shoe 38 is thereby moved lengthwise over the resistance strip 45 in response to changes in the rate of flow of the gasoline through the flow chamber 10. The movement of the contactor along the resistance strip 45 operates to vary the resistance in the circuit of the indicator in a well known manner, and the rate of flow of the gasoline in gallons per hour or other desired units may be obtained at any moment from the reading of the indicator.

As illustrated in the drawing, the rigid contact shoe 37 engages with the contact strip 44 within the longitudinally extending groove 65, and the pivoted contact shoe 38 engages within the longitudinally extending depression in the windings of the resistance wire 61 formed by depressing the windings within the groove 63 in the core 59. The engagement of the contact shoes within the grooves of the contact strip and the resistance strip serves to guide the movable contactor and the metering disc in their movements corresponding to variations in flow of the gasoline through the flow chamber. The substantial length of the rigid contact shoe 37 also assists materially in guiding the movable contactor and the metering disc in a direction axially of the flow chamber.

The contact shoes 37 and 38 are prevented from being dislodged from their positions adjacent the contact strip and the resistance strip by the overhanging edges 47 which form the slots 48 within which the contact shoes operate. It will be understood, however, that these contact shoes are out of engagement with the overhanging edges 47 during the normal operation of the system, and that this particular structure merely serves to prevent the contact shoes from being entirely dislodged from the contact strip and the resistance strip when the system is subjected to any unusual physical disturbance.

The flow chamber 10 is completely filled with gasoline at all times. The contact shoes 37 and 38, the contact strip 44, and the resistance strip 45 are therefore immersed in gasoline and lubricated at all times to thereby increase the sensitivity. As will be clear from the structure shown in Fig. 1, the dashpot cistern 24 is likewise completely filled with gasoline at all times, there being no flow through the cistern 24 however, even during operation of the system. Inasmuch as the piston 34 is connected to the metering disc 27 so as to partake of the movements thereof due to variations in flow of the gasoline through the flow chamber, the piston serves to dampen any abnormal movements of the metering disc due to the passage of air or vapor through the device, or to sudden surges of gasoline in the fuel line or in the flow chamber by reason of unusual road conditions, sudden increase or decrease in speed, or abrupt changes in direction of movement of the vehicle with which the system is used.

The operation of the various other elements of the apparatus will be apparent from the above structural description. While a certain arrangement of the elements, as well as a certain form of these elements, has been disclosed, it is to be understood that these forms and their arrangement are intended for illustrative purposes only and that my invention contemplates such changes therein as come within the scope of the appended claims. It is to be understood further that, while it has been disclosed in a form adapting it for use in indicating the rate of flow of gasoline or the like, the device, or parts thereof, is equally adapted for use with gaseous fluids, for indicating rate of fluid flow generally, without regard to the purpose for which the fluid is employed, and for controlling electrical circuits other than the circuits of flow meter indicators.

Having thus described my invention, what I claim is:

1. In apparatus for indicating the rate of flow of a fluid through a flow chamber, a variable resistance device comprising a stationary contact strip supported within said chamber and having means for connecting an electrical indicator thereto, a stationary resistance strip supported within said chamber parallel to and spaced from said contact strip and having a ground connection at one end thereof and a switch in said chamber for making and breaking a circuit connection to the opposite end thereof, a contactor in said chamber movably engaging said strips, and means for moving said contactor in response to changes in the rate of flow of the fluid through said chamber and for actuating said switch upon a predetermined minimum rate of flow of the fluid.

2. In a variable resistance device, a fixed contact strip, a support for said contact strip including a channel enclosing the same and having overhanging edges to provide a slot extending longitudinally of said strip, a fixed resistance strip spaced from and parallel to said contact strip, a support for said resistance strip including a channel enclosing the same and having overhanging edges to provide a slot extending longitudinally of the resistance strip, and a movable contactor guided within said slots and slidably engaging said strips.

3. In a variable resistance device, a fixed contact strip, a support for said contact strip including a channel enclosing the same and having overhanging edges to provide a slot extending longitudinally of said strip, a fixed resistance strip spaced from and parallel to said contact strip, a support for said resistance strip including a channel enclosing the same and having overhanging edges to provide a slot extending longitudinally of the resistance strip, and a movable contactor comprising a rigid contact shoe guided in one of said slots in slidable engagement with said contact strip, a contact shoe movable with respect to said rigid shoe and guided in the other of said slots in slidable engagement with said resistance strip, and resilient means urging said shoes into engagement with their respective strips.

4. In a variable resistance device, a rigid support having a pair of oppositely arranged parallel channels provided with overhanging edges forming opposing guiding slots, a contact strip frictionally supported within one of said channels, a resistance strip frictionally supported within the other of said channels, and a movable contactor supported in said guiding slots in slidable engagement with said strips.

5. In a variable resistance device, a substantially cylindrical rigid support having a pair of oppositely arranged parallel channels provided with overhanging edges forming opposing guiding slots on the interior thereof, a contact strip frictionally supported within one of said channels, a resistance strip frictionally supported within the other of said channels, and a movable contactor supported in said guiding slots in slidable engagement with said strips.

6. A variable resistance device comprising a substantially cylindrical rigid casing of insulating material having a pair of oppositely arranged parallel channels formed in its side walls and opening into the interior thereof through opposing longitudinal slots, a contact strip frictionally supported in one of said channels, a resistance strip frictionally supported in the other of said channels, and a movable contactor guided in said slots in slidable engagement with said strips.

7. In apparatus for indicating the rate of flow of a fluid through a flow chamber, a variable resistance device comprising a grooved contact strip supported within said chamber, a grooved resistance strip supported in said chamber with the groove thereof parallel to and spaced from the groove in said contact strip, a contactor support movable within said chamber, relatively movable contact shoes on said support slidably engaging within the grooves in said strips, spring means for urging said shoes into engagement with said strips, and means for moving said support in response to changes in the rate of flow of the fluid through said chamber.

8. A resistance element comprising a strip of insulating material having a continuous groove extending longitudinally substantially through the length of one face thereof and a resistance wire spirally wound around said strip with the coils thereof depressed within said groove to tighten them around said strip and form a guideway for a contactor.

9. A resistance element comprising a strip of insulating material having a continuous groove extending longitudinally substantially through the length of one face thereof and a pair of spaced openings extending transversely therethrough, and a resistance wire spirally wound around said strip with the coils thereof depressed within said groove to tighten them around said strip and form a guideway for a contactor and with the opposite ends looped through said openings.

10. A resistance element comprising a strip of insulating material having a pair of spaced openings extending transversely therethrough and a continuous groove extending longitudinally in one face thereof between said openings, and a resistance wire spirally wound around said strip with the coils thereof depressed within said groove to tighten them around said strip and form a guideway for a contactor and with the opposite ends looped through said openings.

CARROLL P. SHERWOOD.